United States Patent Office 3,217,800
Patented Nov. 16, 1965

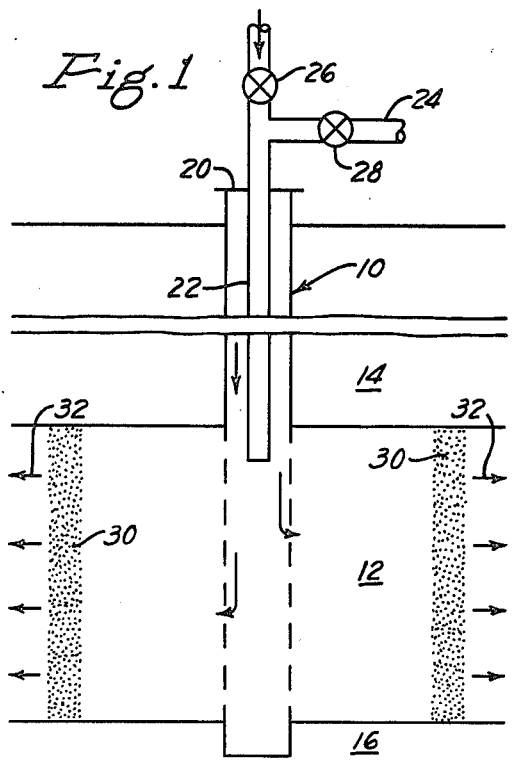
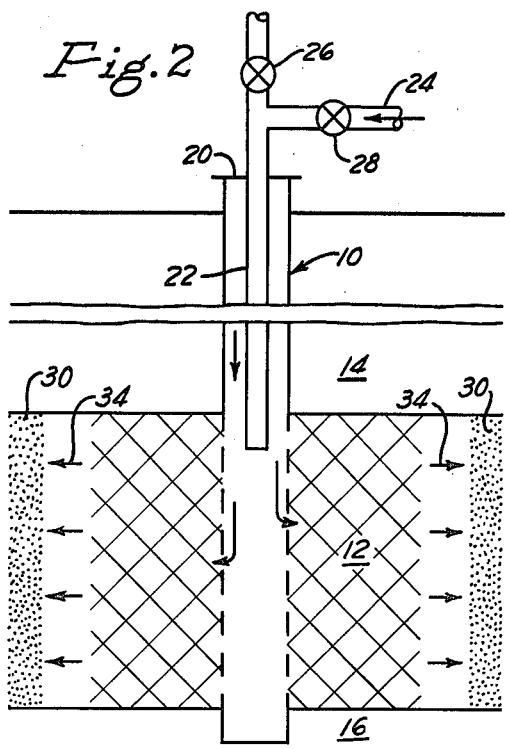
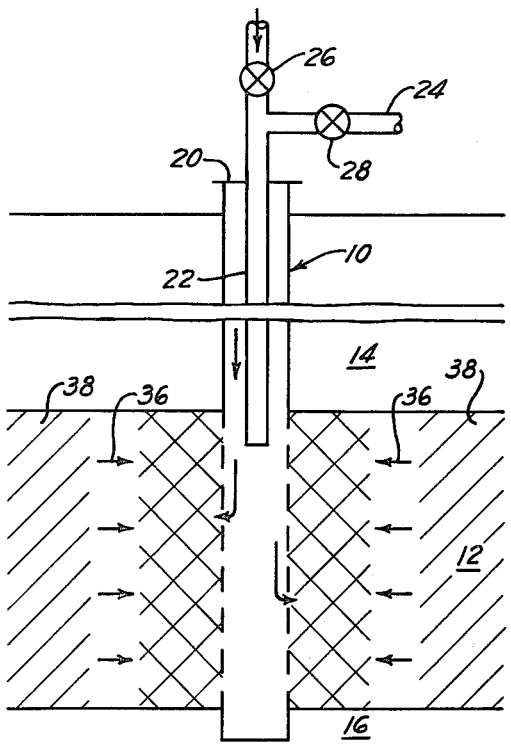

3,217,800
CONSOLIDATION OF INCOMPETENT
SUBSURFACE FORMATIONS
Francis M. Smith, Butler, Pa., assignor to Gulf Research
& Development Company, Pittsburgh, Pa., a corporation of Delaware
Filed Feb. 14, 1963, Ser. No. 258,459
6 Claims. (Cl. 166—25)

This invention relates to the production of oil and gas from an incompetent subsurface formation, and more particularly to a method of bonding the particles of an incompetent subsurface formation into a coherent permeable mass.

In many oil- or gas-bearing formations, the particles comprising the formation are not effectively cemented together which results in the formation being either substantially unconsolidated or only loosely consolidated. When fluids are produced from such formations, solid particles of the formation flow into the well; hence, the formations are frequently referred to as incompetent formations. If the formation fluids in incompetent formations are under high pressure, the particles of the formation will flow through the tubing and other equipment in the well at high velocities causing severe erosion of the equipment in the well. In other instances, when the flow rates through the well are not so high, the solid particles flow into the well and plug the tubing. It is then necessary to perform expensive work-over operations on the well to place it back in operation. In extreme cases, the incompetent oil-bearing formation surrounding the well is washed out and undermines the overlying formations penetrated by the well with the result that those formations sometimes collapse and damage the well.

One method that has been used to reduce the flow of sands from an incompetent formation into a well is to set a slotted liner in the borehole through the producing formation and produce formation fluids through the slots of the liner. Sometimes the setting of a slotted liner is combined with a gravel packing operation in which sand is packed around the liner to provide support for the incompetent formation. Both of these methods have the shortcoming that sands in the incompetent formation are still free to move and, hence, can plug the gravel pack or liner. Moreover, the setting of liners and gravel packing around liners may require several round trips into a well which seriously increases the cost of the well completion.

Another method that has been suggested to stabilize incompetent formations is to displace a liquid capable of setting to form a resin from a well outwardly into the formation, and thereafter causing the liquid to set to form a resin coating the particles and bonding them together. Most liquids capable of setting to form a resin of sufficient strength to bond the particles together and withstand the flow of formation fluids are relatively expensive. Large quantities of the liquid are required to bond particles of the formation for a sufficient distance from the well to prevent movement of particles of the formation; hence, bonding a formation with resins, like setting liners or gravel packing, is usually an expensive method of completing a well. The expense of bonding with resins frequently is further increased by the necessity of treating the surface of particles of the formation prior to the injection of the resin-forming liquid to cause a strong bond of the resin to the particles of the formation.

This invention resides in a method of stabilizing an incompetent formation surrounding a well by bonding particles of the formation into a coherent mass with coke formed in place in the formation by a reverse burning in-situ combustion process. In the process of this invention, oil present in the formation immediately surrounding the well is ignited, and an oxygen-containing gas is injected from the well into the formation to cause forward burning to proceed radially outwardly from the well. Thereafter, injection of oxygen is stopped and a combustible cokable liquid is displaced from the well into the burned-out portion of the formation surrounding the well. The injection of the cokable liquid is followed by injection of an oxygen-containing gas, such as air, which fingers its way through the cokable liquid. When the air comes in contact with the hot portion of the reservoir in the vicinity of the combustion zone at the end of the forward burning, oil present in the formation at that area is ignited. Continued injection of the oxygen-containing gas causes reverse burning of the injected cokable liquid to proceed until the combustion front reaches the borehole wall. The reverse burning leaves a residue of coke strongly adhering to the particles of the formation and bonding the particles into a strong permeable mass.

In the drawings.

FIGURE 1 is a diagrammatic view showing in elevation a well penetrating a subsurface incompetent formation at a stage of the process of this invention near the end of the forward burning;

FIGURE 2 is a diagrammatic view similar to FIGURE 1 during the displacement of a cokable liquid from the well into the surrounding incompetent formation; and FIGURE 3 is a diagrammatic view similar to FIGURE 1 of the well during the reverse burning of the cokable liquid to leave a residue of coke on the particles of the formation.

Referring to FIGURE 1, a well indicated generally by reference numeral 10 is illustrated extending downwardly through an incompetent formation 12 between cap rock 14 and base rock 16. Well 10 is illustrated extending completely through the incompetent formation 12 extending into the base rock 16. The well 10 preferably has casing set through the incompetent formation, cemented in place, and perforated by conventional procedures. The upper end of the well 10 is illustrated with a cap 20 having tubing 22 extending therethrough and down the well to the incompetent formation 12. Tubing 22 is connected at its upper end to an air supply source, not shown. A T in tubing 22 above cap 20 provides a side inlet for a supply line 24. Flow of air into the upper end of the tubing 22 is controlled by a valve 26, and flow of fluids into tubing 22 from the supply line 24 is controlled by a valve 28 in the supply line.

In the first step of the process for the consolidation of the formation 12, forward burning in-situ combustion is caused to proceed from the borehole of the well radially outwardly into formation 12. If formation 12 is a gas-bearing formation, a suitable fuel oil such as a heavy crude oil may be displaced from the well outwardly into the formation surrounding the well prior to the initiation of the forward burning. If the formation 12 is an oil-bearing formation, the oil in place in the formation can be used to supply the fuel for the forward burning.

Ignition of oil in the formation 12 is accomplished by conventional techniques such as by running an electric heater into the well adjacent to formation 12 and displacing an oxygen-containing gas, preferably air, downwardly through tubing 22 and outwardly into formation 12. Another method that can be used for ignition of oil in the formation is to install a burner in the well opposite the incompetent formation 12. The burner is connected with suitable fuel and air lines. Oxygen-containing gas and fuel are displaced down the well to the burner and the fuel burned in the well until the surrounding formation reaches a temperature at which the injection of an oxygen-containing gas will ignite oil in the formation 12. The supply of fuel is stopped and the supply of oxygen-containing gas is continued to cause the forward burning to proceed. A preferred method of initiating forward burning to displace a pyrophoric liquid such as triethylborane downwardly through tubing 22 and outwardly into the formation 12. Air is then displaced down the tubing and outwardly into the formation. The air and triethylborane are separated in the tubing by a slug of kerosene. Upon contact of air with the triethylborane, the triethylborane is ignited whereupon sufficient heat is released to ignite oil present in the formation.

Injection of oxygen-containing gas, preferably air is continued after ignition of the oil in the surrounding formation to continue forward burning until the combustion front moves outwardly a desired distance, for example, ten feet, into the formation surrounding the well. During this stage of the operation, the combustion front, indicated by stippling 30, moves outwardly in the same direction as the injected air, as indicated by arrows 32. During the forward burning process, the air displaced from the well into the formation cools the formation adjacent the well and carries the heat picked up from the formation outwardly to the combustion front 30.

Referring to FIGURE 2, after forward burning has continued for the desired distance into the formation, the valve 26 is closed, valve 28 is opened, and a readily cokable and combustible liquid is introduced through supply line 24 into tubing 22 and displaced downwardly into the well and outwardly into the incompetent formation 12. In the stage of the operation illustrated in FIGURE 2, the readily cokable liquid has been displaced almost entirely through the burned-out area to the area of the combustion front 30 at the time injection of air was discontinued. The cokable liquid further cools the formation adjacent the borehole of the well and carries the heat outwardly from the well 10. Because of their low cost, heavy crude oils containing residual fractions and reduced crude oils such as heavy fuel oils are preferred cokable liquids. Heavy aromatic oils such as anthracene, or suspensions of asphaltenes in diesel or fuel oil also can be used. The arrows 34 indicate the direction of movement of the cokable liquid toward the combustion front 30.

After sufficient cokable liquid has been displaced into the formation to fill the volume between the combustion front and the borehole of the well at the end of the forward burning step, an oxygen-containing gas, preferably air, is displaced downwardly through tubing 22 and outwardly into the formation 12. The air, because of its low viscosity, fingers its way through the cokable liquid to the hot region of the formation at or adjacent the combustion front 30 at the end of the forward burning step.

The high temperature of the oil at that location causes ignition of the oil originally present in the formation or the cokable liquid, and thereby initiates reverse burning. Continued injection of air into the formation causes the combustion front to move in the direction indicated by arrows 36 in a direction countercurrent to the movement of the injected air. The injection of the air is continued until the reverse combustion proceeds to the borehole wall whereupon injection of the air is stopped. A thermocouple or other temperature indicating device can be installed in the casing to indicate when the combustion front has reached the borehole wall during the reverse burning step.

A characteristic of reverse burning in-situ combustion is that a residue of coke is left on the particles of the formation. The coke residue is strong and hard and bonds the particles of the formation together in a strong coherent permeable mass, indicated in FIGURE 3 by shading 38. The flow of gas through the formation as the coke is formed insures permeability of the stabilized formation.

In an example of a method of stabilizing an unconsolidated sand by the process of this invention, a thin-walled stainless steel combustion tube 5 inches in diameter and 5 feet long was packed with 70 to 150 mesh sand. An electric heating coil was wrapped around the combustion tube for a distance of one foot from the inlet end. The combustion tube was installed in a pressure jacket and provided with suitable fittings at each end for passing fluids through the tube. Nitrogen was delivered under pressure into the annular space between the combustion tube and jacket to balance the pressure within the combustion tube during the experimental run. Thermocouples were installed at 6-inch intervals along the length of the combustion tube.

Water was circulated through the combustion tube to saturate the sand in the tube with water, and the water was followed by crude oil circulated through the combustion tube to reduce the water concentration to a concentration approximating connate water in a reservoir. Nitrogen was passed through the tube to establish gas permeability. While the nitrogen was passed through the combustion tube, the pressure within the tube was raised to 500 pounds per square inch and an electric current was passed through the electric heater to raise the temperature of the inlet end of the combustion tube to approximately 400° F. Circulation of nitrogen was stopped and air at a pressure of 500 pounds per square inch was passed through the combustion tube. Crude oil in the combustion tube was ignited at the inlet end of the tube, and forward burning proceeded for a distance of 3 feet toward the discharge end of the tube. Air injection was then stopped and crude oil from a producing lease in California was displaced into the tube to fill the space between the combustion front at the end of the forward burning and the inlet end of the tube. Injection of air into the combustion tube after the crude oil caused oil present in the combustion tube to be ignited substantially at the location of the combustion zone at the end of the forward burning to commence reverse combustion. The air injection was continued until the combustion front had moved substantially to the inlet end of the tube. Inspection of the sand after the combustion tube was disassembled showed two feet of hard, permeable, coked sand had been formed adjacent the inlet end of the tube.

Frequently an unconsolidated oil-bearing formation will have substantial thickness which makes it difficult to insure uniform stabilization of the formation adjacent the borehole of the well throughout the depth of the formation. A preferred method of obtaining the desired stabilization of such formations is to set casing through the formation into the bed rock and cement it in place by conventional procedures. Thereafter, a single notch, or a series of perforations, is cut through the casing over a limited area. That area is isolated by means of packers set within the casing and then treated by the combined forward-reverse combustion process of this invention in the isolated section of the borehole. By limiting the area of the formation exposed, preferably to a single circumferential notch cut through the casing, uniformity of treatment of the portion of the incompetent formation through the exposed area is insured.

In very thick formations, a single notch may restrict production from the well excessively. It will then be desirable to repeat the formation stabilization process in a series of isolated portions of the casing spaced through the interval of the incompetent formation. Each isolated area is individually stabilized by the process of this invention to insure uniform consolidation of the incompetent formation adjacent each opening in the casing.

It is an important feature of this invention that heat released in the formation adjacent the well during the forward combustion step is carried outwardly from the well during the forward combustion and during the subsequent displacement of the cokable liquid into the formation and transferred to the formation more distant from the well. Sufficient heat is released during the forward combustion step to insure a temperature at the end of the injection of the cokable liquid above 200° F., preferably above 250° F., and still more desirably above 300° F. at the location at which initiation of the subsequent reverse combustion is desired. The final stages of the forward burning and the injection of the cokable liquid should cool the formation immediately adjacent the well to a temperature below 200° F. The resultant cooling of the formation adjacent the well prevents auto-ignition of the cokable liquid close to the well when the oxygen-containing gas follows the cokable liquid into the formation. Moreover, transferring heat liberated during the forward combustion step to the location at which the outer boundary of the stabilized zone of the formation is desired insures ignition and initiation of the reverse combustion at the desired location.

The forward burning step used in this invention creates a combustion front which moves radially outwardly from the well at a substantially uniform rate in all directions. As a result, the subsequent reverse combustion which proceeds from approximately the location of the combustion front at the end of the forward burning step results in a stabilized section of the incompetent formation extending substantially the same distance from the well in all radial directions.

I claim:

1. A method of stabilizing an incompetent formation penetrated by a well comprising heating said formation adjacent the well to a temperature sufficient to initiate and maintain reverse combustion of a cokable liquid to be subsequently injected into said formation upon contact with an oxygen-containing gas, thereafter displacing said cokable liquid from the well into the formation to displace heat in the formation adjacent the well outwardly from the well whereby the temperature at the outer boundary of the cokable liquid exceeds the ignition temperature of said cokable liquid upon contact with said oxygen-containing gas and the temperature of the cokable liquid adjacent the well is lower than said ignition temperature, thereafter and before the formation cools at the outer boundary of the cokable liquid to a temperature below said ignition temperature injecting an oxygen-containing gas from the well into the formation to initiate reverse combustion at a position spaced from the well, and continuing the injection of the oxygen-containing gas to cause reverse combustion to proceed substantially to the well.

2. A method of stabilizing an incompetent oil-bearing formation penetrated by a well comprising igniting oil in the formation adjacent said well, displacing an oxygen-containing gas from the well into the formation to cause forward burning to proceed radially outwardly from the well, stopping the injection of the oxygen-containing gas, thereafter displacing a cokable liquid into the formation surrounding the well in which forward burning has occurred to displace heat outwardly from the well whereby the temperature at the outer boundary of the cokable liquid exceeds the ignition temperature of said cokable liquid upon contact with an oxygen-containing gas, thereafter and before the formation at the outer boundary of the cokable liquid cools to a temperature below said ignition temperature injecting an oxygen-containing gas from the well into the formation whereby reverse combustion is initiated at a location spaced radially from the well, and continuing the injection of the oxygen-containing gas to cause reverse combustion to proceed substantially to the well.

3. A method of stabilizing an incompetent oil-bearing formation penetrated by a well comprising heating the formation surrounding the well, injectng an oxygen-containing gas from the well into said formation to ignite oil therein, continuing the injection of the oxygen-containing gas to cause forward combustion to proceed for a radial distance of approximately ten feet from the well, stopping the injection of the oxygen-containing gas, thereafter injecting a cokable liquid from the well into the formation to fill the formation with cokable liquid for a radial distance of approximately ten feet whereby heat is moved outwardly from the well to establish a temperature at the outer boundary of said cokable liquid exceeding the ignition temperature of said cokable liquid upon contact with an oxygen-containing gas and the temperature of the cokable liquid adjacent the well is lower than said ignition temperature, thereafter and before cooling of the cokable liquid at the outer boundary thereof below said ignition temperature injecting an oxygen-containing gas from the well into the formation to initiate reverse combustion at the outer boundary of the cokable liquid, and continuing the injection of the oxygen-containing gas to cause reverse combustion to proceed substantially to the borehole of the well.

4. A method of stabilizing an incompetent formation penetrated by a well comprising injecting an oil down the well and into the formation surrounding the well, heating oil in the formation surrounding the well, injecting an oxygen containing gas from the well into the formation to initiate forward burning in the formation surrounding the well, continuing the injection of the oxygen-containing gas to cause forward combustion to proceed for a desired radial distance from the well, thereafter displacing a combustible cokable liquid from the well to substantially fill the formation surrounding the well for said desired distance whereby heat is carried outwardly through the formation by the cokable liquid to establish a temperature at the outer boundary of the cokable liquid exceeding the ignition temperature of said cokable liquid upon contact with an oxygen-containing gas and the temperature adjacent the well is lower than said ignition temperature, then before the cokable liquid at the outer boundary thereof cools to a temperature below the ignition temperature injecting an oxygen-containing gas from the well into the formation to initiate reverse combustion substantially at said desired distance from the well, and continuing the injection of the oxygen-containing gas until reverse combustion proceeds substantially to the borehole of the well.

5. A method of stabilizing an incompetent oil-bearing formation penetrated by the borehole of a well comprising setting casing in the well through the incompetent formation, cutting a notch in the casing in the interval of the incompetent formation, igniting oil in the formation adjacent the notch in the casing, displacing an oxygen-containing gas down the casing and outwardly through the notch to cause forward burning of oil in the formation adjacent the notch, stopping the injection of the oxygen-containing gas when forward burning has proceeded for a desired distance, thereafter injecting a combustible cokable liquid through the notch into the incompetent formation whereby heat is displaced outwardly through the formation by said cokable liquid to establish a zone spaced from the well of cokable liquid at a temperature higher than the ignition temperature of said cokable liquid upon contact with an oxygen-containing gas, then before the cokable liquid cools below the ignition temperature displacing air down the well and through the notch into the incompetent formation to ignite the cokable liquid at a location spaced from the well, and continuing the displacement of the oxygen-containing gas into the incompetent formation to cause reverse combustion to proceed through the formation substantially to the well.

6. A method as set forth in claim 2 in which the temperature of the cokable liquid adjacent the well is below 200° F. and the temperature of the cokable liquid at the outer boundary thereof exceeds 300° F. whereby ignition of said cokable liquid occurs at the outer boundary thereof upon contact with the oxygen-containing gas.

References Cited by the Examiner

UNITED STATES PATENTS

| | | | |
|---|---|---|---|
| 2,793,696 | 5/1957 | Morse | 166—39 X |
| 2,793,697 | 5/1957 | Simm et al. | 166—39 |
| 3,003,555 | 10/1961 | Freeman et al. | 166—39 X |
| 3,044,546 | 7/1962 | Dixon | 166—39 X |
| 3,106,959 | 10/1963 | Huitt et al. | 166—21 X |
| 3,134,435 | 5/1964 | Wyllie | 166—25 |

BENJAMIN HERSH, *Primary Examiner.*